(12) United States Patent
Patel et al.

(10) Patent No.: US 11,169,834 B2
(45) Date of Patent: Nov. 9, 2021

(54) DYNAMIC PLATFORM FEATURE TUNING BASED ON VIRTUAL MACHINE RUNTIME REQUIREMENTS

(71) Applicant: Intel Corporation, Santa Clara, CA (US)

(72) Inventors: Mihir Patel, Hillsboro, OR (US); Ryan Kern, Hillsboro, OR (US); Dilip Shivaraju, Hillsboro, OR (US); Emad Attia, Hillsboro, OR (US); Corey Gough, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 15/718,655

(22) Filed: Sep. 28, 2017

(65) Prior Publication Data

US 2019/0095231 A1 Mar. 28, 2019

(51) Int. Cl.
*G06F 9/455* (2018.01)
*H04L 12/24* (2006.01)
(Continued)

(52) U.S. Cl.
CPC ........ *G06F 9/45558* (2013.01); *G06F 9/4881* (2013.01); *H04L 41/0806* (2013.01);
(Continued)

(58) Field of Classification Search
CPC .............. G06F 1/3203; G06F 1/3206; G06F 1/3287; G06F 9/45533; G06F 9/50; G06F 9/5027;
(Continued)

(56) References Cited

U.S. PATENT DOCUMENTS 6,058,466 A * 5/2000 Panwar ................. G06F 9/3802
712/15
2009/0172423 A1* 7/2009 Song ..................... G06F 1/3203
713/300
(Continued)

OTHER PUBLICATIONS

Intel, "Chapter 24.6: VM-Execution Control Fields", Intel 64 and IA-32 Architectures Software Developer's Manual, Sep. 2016, 61 pages, vol. 3.

*Primary Examiner* — Dong U Kim
(74) *Attorney, Agent, or Firm* — Jordan IP Law, LLC

(57) ABSTRACT

Systems, apparatuses and methods may provide for technology that dynamically tunes platform features based on virtual machine runtime requirements. In one example, a first virtual machine and a second virtual machine of a cloud server platform may each be associated with one or more logical cores. The first virtual machine may have a first configuration to efficiently support a first feature setting arrangement on the associated logical cores. The second virtual machine may have a different second configuration to efficiently support a different second feature setting arrangement on the different associated logical cores. Feature settings that are specific to an application associated with a virtual machine may be determined based on application runtime requirements. Such determined feature settings may be stored as a bit mask in control fields of a virtual machine control and enforced on the logical cores associated with a given virtual machine.

21 Claims, 7 Drawing Sheets

(51) Int. Cl.
*G06F 9/48* (2006.01)
*H04L 29/08* (2006.01)

(52) U.S. Cl.
CPC .............. *G06F 2009/4557* (2013.01); *G06F 2009/45579* (2013.01); *G06F 2009/45595* (2013.01); *H04L 67/10* (2013.01)

(58) Field of Classification Search
CPC .............. G06F 9/5077; G06F 9/45558; G06F 9/4881; G06F 2009/4557; G06F 2009/45595; H04L 67/10
See application file for complete search history.

(56) References Cited

U.S. PATENT DOCUMENTS

| | | | | |
|---|---|---|---|---|
| 2010/0199277 | A1* | 8/2010 | Galal | G06F 9/45533 718/1 |
| 2012/0084777 | A1* | 4/2012 | Jayamohan | G06F 9/5044 718/1 |
| 2013/0155073 | A1* | 6/2013 | Khodorkovsky | G06F 3/14 345/501 |
| 2013/0311811 | A1* | 11/2013 | Bose | G06F 9/50 713/340 |
| 2014/0258155 | A1* | 9/2014 | Suryanarayanan | H04L 63/10 705/318 |
| 2015/0067214 | A1* | 3/2015 | Henry | G06F 1/3237 710/261 |
| 2018/0088997 | A1* | 3/2018 | Min | G06F 9/5027 |

\* cited by examiner

400

```
Application Runtime Requirements:
    Latency Sensitivity
        [x] Acute
        [ ] None
        [ ] Unknown
    Data Reference Patterns
        [ ] Streaming
        [ ] Random
        [x] Unknown
```

FIG. 3

DYNAMIC PLATFORM FEATURE TUNING BASED ON VIRTUAL MACHINE RUNTIME REQUIREMENTS

TECHNICAL FIELD

Embodiments generally relate to cloud server management. More particularly, embodiments relate to technology that dynamically tunes platform features based on virtual machine runtime requirements.

BACKGROUND

In native servers, administrators may optimize workload performance by modifying (e.g., by enabling, disabling, or changing) platform features (e.g., prefetchers, C-States, P-States, etc.) for the entire platform. For example, turning prefetchers on for the entire platform may improve the performance of high performance computing (HPC) applications by orders of magnitude in some instances. On a public cloud server, such modifications (e.g., by enabling, disabling, or changing platform features) to the platform features may apply across the entire platform (e.g., to each and every virtual machine that runs on that platform).

BRIEF DESCRIPTION OF THE DRAWINGS

The various advantages of the embodiments will become apparent to one skilled in the art by reading the following specification and appended claims, and by referencing the following drawings, in which:

FIG. 3 is a screen shot of an example of a graphical user interface according to an embodiment;

DESCRIPTION OF EMBODIMENTS

As already discussed, enabling, disabling and/or changing platform features on a public cloud server under conventional approaches may apply to each and every virtual machine that runs on that platform. For example, workloads may use the same platform features (e.g., prefetchers, C-States, P-States, etc.) across an entire cloud server platform. Accordingly, there may be no efficient method to adjust these features for each individual virtual machine. Another added difficulty may be that virtual machines typically get scheduled on multiple cores and also get rescheduled regularly by a virtual machine monitor (VMM/Orchestrator).

Accordingly, individual virtual machines running on a common cloud server platform might benefit from using unique feature/control settings at runtime. One option to address this need might be to write to per-thread platform feature model-specific registers (MSRs) at every context switch to adjust the settings that match the runtime requirement of the workloads running on an individual core. Such an approach, however, may be impractical from a performance perspective due to the time involved to read/write these MSRs at every context switch. A modern "2P" server (e.g., two CPU sockets in one motherboard) running a heavy load may have greater than one million context switches per second. Indeed, context switching may already incur a measurable performance penalty. Accordingly, adding more overhead to context switching may not be an appropriate solution.

As will be described in greater detail, an enhanced approach may adjust platform features differently for different virtual machines operating on the same platform since each workload running in a virtual machine may call for different platform features at runtime. For example, such platform setting requirements may typically be workload specific. For example, a software-defined networking (SDN) load balancer/mux application (e.g., which may be latency sensitive) may call for C-states to be disabled while other applications may not necessarily need that. More generally, basic input/output system (BIOS) optimization guidelines often involve different settings for different kinds of workloads.

Figure 1:
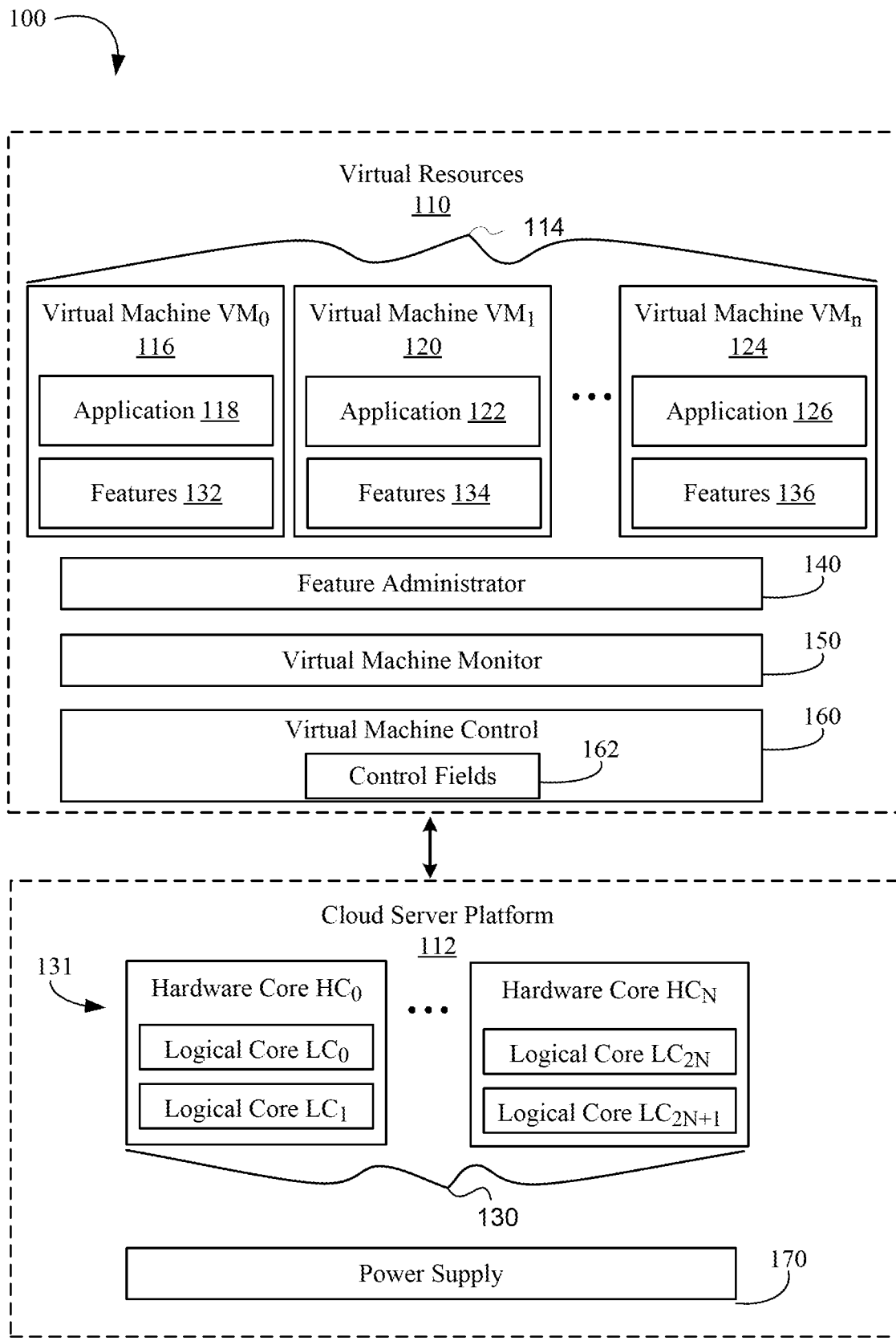
FIG. 1 is a block diagram of an example of a cloud server platform system according to an embodiment.

Turning now to FIG. 1, a virtual machine dynamic tuner system 100 to manage virtual machines is shown. The system 100 may dynamically tune platform features based on virtual machine runtime requirements.

In the illustrated example, the system 100 may include virtual resources 110 and a cloud server platform 112. The virtual resources 110 may include a plurality of virtual machines 114. Each of the plurality of virtual machines 114 may function as a self-contained unit, running its own operating system (OS) and/or application software. For example, the plurality of virtual machines 114 may include a first virtual machine 116 running a first application ("application") 118 and an active second virtual machine 120 running an active second application ("application") 122. Similarly, an Nth virtual machine 124 may run an Nth application ("application") 126.

For example, the active second application 122 associated with the active second virtual machine 120 may be associated with application runtime requirements. Such application runtime requirements may include an indication of latency sensitivity, or an indication of a data reference pattern, the like, and/or combinations thereof. The data reference pattern may include an indication of whether the active second application 122 accesses memory in a random or sequential manner such as, for example, the active second application 122 including a streaming application.

The first virtual machine 116 and the second virtual machine 120 of the system 100 may each be associated with one or more logical cores 130 ("LC$_0$" through "LC$_{2N+1}$") in portions of one or more associated hardware cores 131 ("HC$_0$" through "HC$_N$") of the cloud server platform 112. As illustrated, each of the hardware cores 131 may include two or more of the logical cores 130. As will be described in greater detail below, each of the logical cores 130 may be independently configured using the techniques described herein (e.g., without requiring the use of writes to per-thread platform feature model-specific registers/MSRs). The first virtual machine 116 may have a first configuration to efficiently support first feature settings ("features") 132 on the associated logical cores 130. The second virtual machine 120 may have a different second configuration to efficiently support different second feature settings ("features") 134 on a different portion of associated logical cores 130. For example, the first feature settings 132 may be based at least in part on application runtime requirements associated with the first application 118, while the second feature settings 134 may be based at least in part on application runtime requirements associated with the second application 122. Similarly, the Nth virtual machine 124 may have a still different configuration to efficiently support still different feature settings ("features") 136 associated with the Nth application 126.

The virtual resources 110 may include a feature administrator 140. As used herein, the term "feature administrator" may generally refer to an automated administrator and/or a user administrator configured to control platform settings for each virtual machine on a cloud server platform based at least in part on application runtime requirements. Such an automated agent-type feature administrator 140 may be an intelligent agent that may identify the appropriate feature settings to set on a virtual machine control 160. For example, such an automated agent-type feature administrator 140 may deduce feature settings by collecting historical performance data that will point to runtime requirements for a specific virtual machine workload. In the illustrated example, the feature administrator 140 may determine the active second feature settings 134 specific to the active second application 122 based at least in part on the application runtime requirements. As discussed above, the active second feature settings may include idle power state settings, execution power state settings, or pre-fetch settings, the like, and/or combinations thereof. The prefetcher settings may include core prefetcher settings, uncore prefetcher settings, the like, and/or combinations thereof. The power state settings may include C-State latency tolerance, C-State cache flush tolerance, hardware-controlled performance (HWP) minimum, HWP maximum, HWP energy/performance preference (EPP), the like, and/or combinations thereof.

The virtual resources 110 may include a virtual machine monitor 150. As used herein the term "virtual machine monitor" may generally refer to, for example, a virtual machine monitor (VMM), a hypervisor, a virtual machine orchestrator, etc., configured to manage the execution of a guest operating system in a virtual environment on a virtual machine. In the illustrated example, the virtual machine monitor 150 may independently assign the active second feature settings 134 to the active second virtual machine 120 and independently assign the first feature settings 132 to the first virtual machine 116 on a virtual machine-by-virtual machine basis. Additionally, the virtual machine monitor 150 may iteratively identify reschedule events, and then iteratively schedule the active second virtual machine 120 to run on a specific set of the logical cores 130 in response to identified reschedule events.

The virtual resources 110 may include the virtual machine control 160. As used herein, the term "virtual machine control" may generally refer to a virtual machine control system (VMCS), a virtual machine control (VMC), or any other similar data structure in memory used to manage virtual machines that includes a data structure in memory that may be assigned per individual virtual machines while being managed by a virtual machine monitor. In the illustrated example, the virtual machine control 160 may include control fields 162 to store a bit mask of the active second feature settings 134. The specific set of the logical cores 130 associated with the active second virtual machine 120 may transfer the bit mask of the active second feature settings 134 specific to the active second application 122 from the control fields 162 of the virtual machine control 160, and enforce the active second feature settings 134 specific to the active second application 122 by adapting the operation of the specific set of the logical cores 130 associated with the active second virtual machine 120 to support the active second virtual machine 120 and the active second application 122.

In some examples, the virtual machine control 160 may be a virtual machine control system (VMCS). In such examples, each VMCS may include a per-virtual machine feature management bit mask. The bit mask may allow privileged software to manipulate the features settings for each of the individual virtual machines 114 running on the cloud server platform 112. The feature settings proposed are virtual machine specific requirements (e.g., HWP level) that are an abstraction of an underlying microarchitecture set of platform features (e.g., Core Frequency). The VMCS area may include a number of different regions. The control fields 162 may store the feature bit mask in previously reserved bits (e.g., undefined/unused bits) of the VMCS. For example, software interfaces may specify some bits as reserved, so that these reserved bits can be used when that interface needs to be extended to add new capabilities. Accordingly, when the new capability of the feature bit mask is added, bits that were previously reserved may now be redefined as the feature bit mask. The logical cores 130 may enforce the bit mask instead of current model-specific registers (MSRs) settings (e.g., IA32_MISC_ENABLE or the like). That is, when one of virtual machines 114 gets scheduled on a specific set of the logical cores 130, the specific set of the logical cores 130 will reset platform features according to the bit mask field in the VMCS.

The cloud server platform 112 may include a power source 170. The power source 170 may provide power to the system 100. It will be understood that system 100 and cloud server platform 112 may include other components not illustrated here for the sake of clarity.

In operation, the virtual machine monitor 150 may control/manage the workload runtime requirements by setting a bit mask on the virtual machine control 160. This bit mask may define the active feature settings 134 required by the active second virtual machine 120. The logical cores 130 associated with the active second virtual machine 120 may change to read that bit mask and enforce the active feature settings 134 requested for the active second virtual machine 120. These settings may remain configured for each of the virtual machines 114 regardless of which core/socket or system the virtual machines 114 are scheduled on. For example, the virtual machines 114 may migrate across physical systems. In such a migration, the virtual machines 114 may preserve all application and state information.

Figure 2:
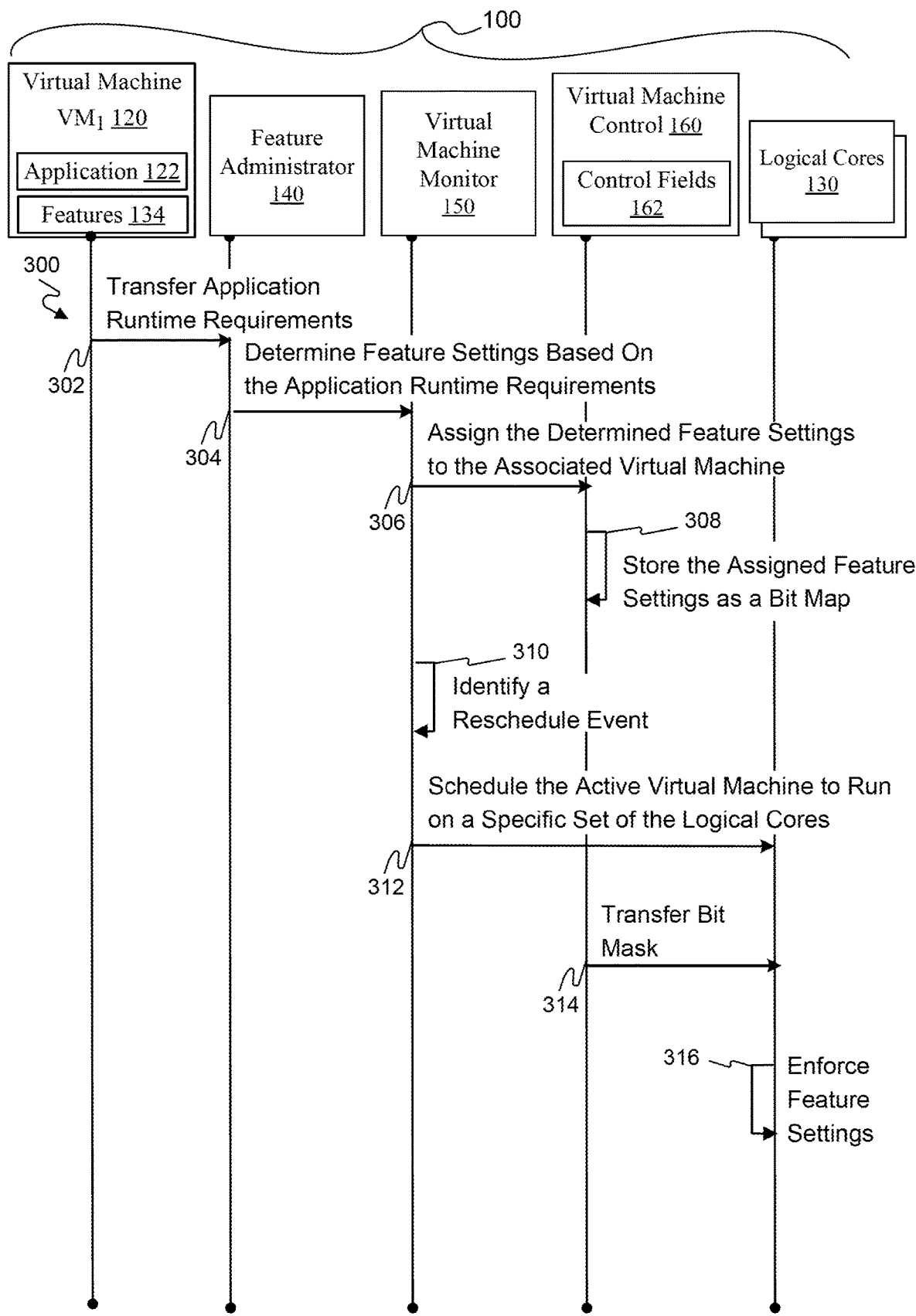
FIG. 2 is a sequence diagram of an example of operations conducted in a cloud server platform according to an embodiment.

FIG. 2 shows a method 300 of dynamically tuning virtual machines. The method 300 may generally be implemented via one or more of the components of the system 100 (FIG. 1), already discussed.

With continuing reference to FIGS. 1 and 2, at operation 302 (e.g., "Application Runtime Requirements"), application runtime requirements may be transferred. For example, the application runtime requirements may be transferred between the active application 122 ("application") and the feature administrator 140.

At operation 304 (e.g., "Determine Feature Settings Based On the Application Runtime Requirements"), feature settings may be determined based at least in part on the application runtime requirements. For example, the active feature settings 134 ("features") that are specific to the active application 122 associated with the active second virtual machine 120 may be determined by feature administrator 140 based at least in part on application runtime requirements.

In some implementations, the application runtime requirements may include one or more of an indication of latency sensitivity, or an indication of a data reference pattern, the like, and/or combinations thereof. The data reference pattern may include an indication of whether the active application 122 accesses memory in a random or sequential manner. For example, operation 304 might determine whether the active application 122 is a streaming application. The active feature settings 134 may include one or more of idle power state settings, execution power state settings, or pre-fetch settings, the like, and/or combinations thereof.

At operation 306 (e.g., "Assign the Determined Feature Settings to the Associated Virtual Machine"), the determined feature settings may be assigned to the associated virtual machine. For example, the active feature settings 134 may be independently assigned via the virtual machine monitor 150 to the active second virtual machine 120. Similarly, different active feature settings (not illustrated here) may be independently assigned to the other virtual machines (not illustrated here) on a virtual machine-by-virtual machine basis.

At operation 308 (e.g., "Store the Assigned Feature Settings as a Bit Map"), the assigned feature settings may be stored as a bit map. For example, the active feature settings 134 may be stored as a bit mask in the control fields 162 of the virtual machine control 160.

At operation 310 (e.g., "Identify a Reschedule Event"), a reschedule event may be identified. For example, rescheduled events may be iteratively identified by the virtual machine monitor 150.

At operation 312 (e.g., "Schedule the Active Virtual Machine to Run on a Specific Set of Logical Cores"), the active virtual machine may be scheduled to run on a specific set of the logical cores. For example, the active second virtual machine 120 may be iteratively scheduled by the virtual machine monitor 150 to run on a specific set of the logical cores 130 in response to the identified reschedule events.

At operation 314 (e.g., "Transfer Bit Mask"), the bit mask may be transferred. For example, the bit mask of active feature settings 134 specific to the active application 122 may be transferred from the control fields 162 of the virtual machine control 160 to the specific set of the logical cores 130.

At operation 316 (e.g., "Enforce Feature Settings"), the feature settings may be enforced. For example, the active feature settings 134 specific to the active application 122 may be enforced on the specific set of the logical cores 130 by adapting the operation of the specific set of the logical cores 130 to support the active second virtual machine 120 and the active application 122. In one implementation, the first virtual machine 116 and the second virtual machine 120 of the cloud server platform 112 may each be associated with one or more of the logical cores 130. The first virtual machine 116 may have a first configuration to efficiently support a first feature setting arrangement on the associated logical cores 130, where this configuration may be enforced in an operation similar to operation 316. The second virtual machine 120 may have a different second configuration to efficiently support a different second feature setting arrangement on the different associated logical cores 130, where this configuration may be enforced at operation 316. As described above, feature settings that are specific to any particular application associated with a corresponding virtual machine may be determined based on application runtime requirements.

In one implementation, method 300 may operate so that the feature administrator 140 may assign the active feature settings 134 in a virtual basic input/output system (BIOS) by, for example, the virtual machine monitor 150, to the associated active second virtual machine 120. The virtual machine monitor 150 may assign the active feature settings 134 to the associated active second virtual machine 120 (e.g., to turn high performance computing/HPC) style prefetchers on). The virtual machine monitor 150 may write the feature settings in the control fields 162 of the virtual machine control 160 as a bit mask of all feature settings 134 required for the active second virtual machine 120. The active second virtual machine 120 may get scheduled to run on a specific set of the logical cores 130. The specific set of the logical cores 130 accessed the bit mask of the active feature settings 134 required for the active second virtual machine 120 from the control fields 162 of the virtual machine control 160. The specific set of the logical cores 130 enforce platform settings required for the active second virtual machine 120 based at least in part on the active feature settings 134.

Embodiments of the method 300 may be implemented in a system, apparatus, processor, reconfigurable device, etc., for example, such as those described herein. More particularly, hardware implementations of the method 300 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 300 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C #or the like and conventional procedural programming languages, such as the "C" programming language or similar programming languages.

For example, embodiments or portions of the method 300 may be implemented in applications (e.g., through an application programming interface/API) or driver software running on an OS. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

FIG. 3 shows an illustration of an interface 400. The interface 400 is an example of a feature administrator specifying application runtime requirements for use in determining feature settings. As described above, the application runtime requirements may include one or more of an indication of latency sensitivity, or an indication of a data reference pattern, the like, and/or combinations thereof. The data reference pattern may include an indication of whether the active application is a streaming application. In addition to providing the user experience (UX) to an information technology (IT) operator/administrator in plain English via the interface 400, the techniques described herein may take these application runtime requirements and convert them to active feature settings (e.g., via underlying per-thread platform feature model-specific registers/MSRs settings) to be programmed to the bit mask for feature management of each individual virtual machine. Thus, the resulting active feature settings may include one or more of idle power state settings, execution power state settings, or pre-fetch settings, the like, and/or combinations thereof.

The following are a few examples of high-level use cases that may be optimized using the techniques described herein. In one example, an HPC virtual machine may require that prefetchers be enabled while a web virtual machine may not require the same prefetchers, with both virtual machines operating on the same platform. In another example, a latency sensitive virtual machine may require C-States to be disabled during a specific time of day. In a still further example, a virtual machine that may require deterministic performance may set an HWP minimum to one hundred while other virtual machines may require varying levels of HWP, with all the virtual machines operating on the same platform.

Additionally, in one example implementation, an application in charge of monitoring health-diagnostics and life-support systems may be extremely sensitive to latency while having no particular data access patterns. In such an implementation, the interface 400 may also expose profiles options at the virtual machine monitor level with preset definitions for all available application requirements at once (e.g., an "HPC Profile"). Such a life-support example may require aggressive power management features be disabled to reduce latency, and may likely have no preference for prefetcher settings, which would be advantageous for streaming applications or those with a high degree of spatial locality.

Figure 4:
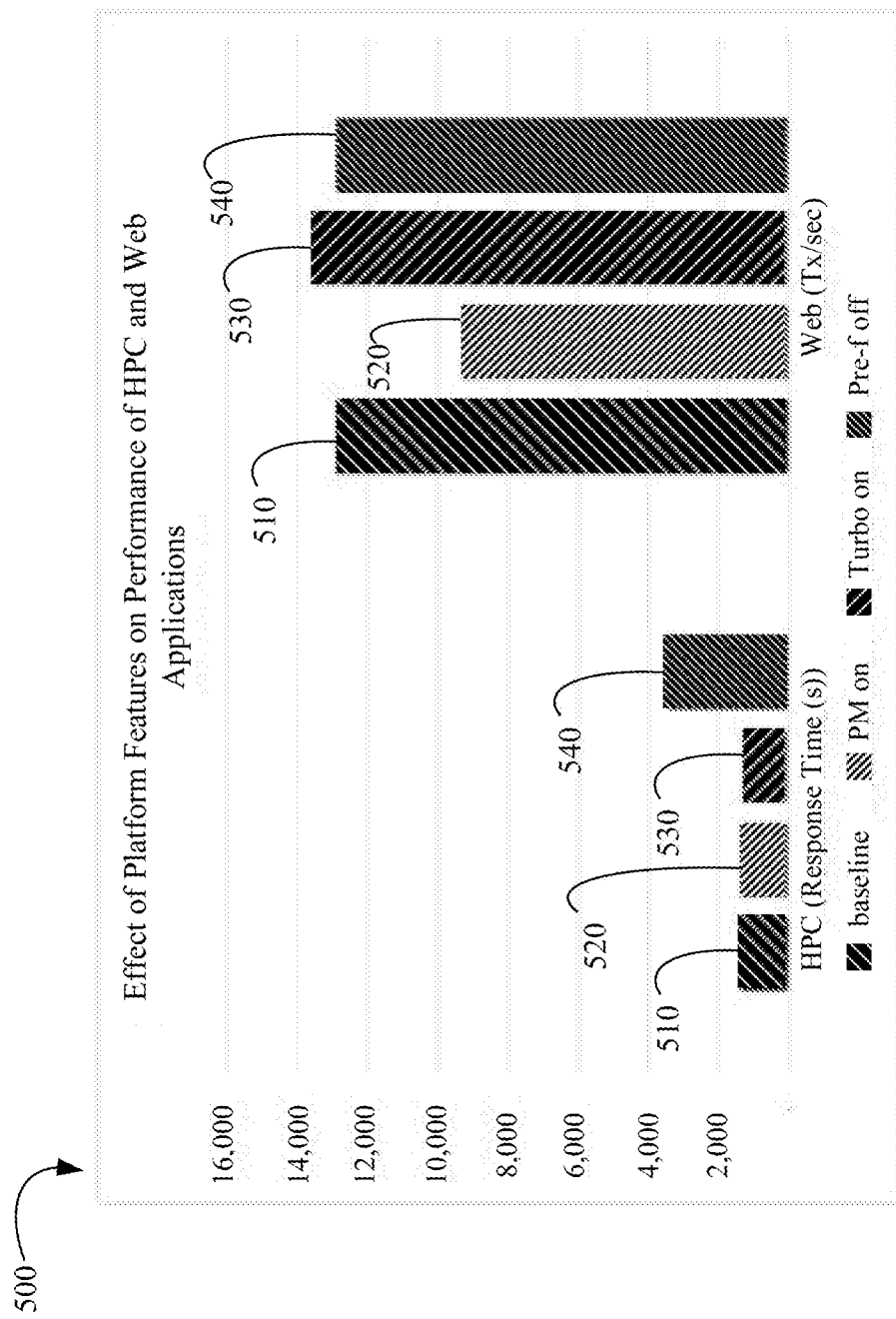
FIG. 4 is a chart of an example of experimental results according to an embodiment.

FIG. 4 shows a chart 500 illustrating experimental results. In the lab, the effect of platform features was prototyped by running different workloads simultaneously and these features were changed one at a time (e.g., baseline 510, Power Management/PM 520, Turbo on 530, Prefetchers off/"Pre-f" 540, etc.). As shown in the chart 500, platform features had significant impact on workload performance.

The results illustrated in FIG. 4 show that for the high performance computing (HPC) workload, the performance was negatively impacted when prefetchers are turned off while it did not affect the performance of a web transactional workload. Additionally, the results show that turning P-States and C-States had no effect on the performance for some workloads (e.g., HPC type applications) while it did impact the performance of other workloads negatively (e.g., a web transactional workload). Lastly, the results show that turning Turbo on, had a positive impact on the web transactional workload, while it had very little positive impact on the HPC workload's performance.

TABLE 1 shows another experiment conducted running web workloads (e.g., each workload running within a separate virtual machine) with another workload that required prefetchers to be on (e.g., an HPC workload in a separate virtual machine). The following table shows the results of the different runs.

TABLE 1

|  | Web transactional workloads running alone (prefetchers on) | Web transactional workloads running with noisy neighbor (prefetchers on) | Web transactional workloads running with noisy neighbor (prefetchers off) |
| --- | --- | --- | --- |
| Throughput (tx/sec) | 45972.39 | 42225.71 | 45481.31 |
| response_time_avg (ms) | 622 | 683 | 596 |
| response_time_1_percentile | 128 | 132 | 136 |
| response_time_5_percentile | 152 | 164 | 168 |
| response_time_25_percentile | 224 | 240 | 244 |
| response_time_50_percentile | 408 | 448 | 444 |
| response_time_75_percentile | 512 | 584 | 572 |
| response_time_95_percentile | 784 | 944 | 928 |
| response_time_99_percentile | 1168 | 1488 | 1392 |
| response_time_max (ms) | 3032123 | 3031173 | 3031689 |
| response_time_min (ms) | 8 | 13 | 9 |

The first column in TABLE 1 shows the throughput and response times for the workloads running alone on the platform with prefetchers on. The second column shows the same numbers when the noisy neighbor requiring prefetchers to be on is added to the mix. The last column shows that the throughput and response times coming back to same levels as the initial run by turning prefetchers off.

The results illustrated in TABLE 1 show that the web workloads do not necessarily need the prefetchers to be on (e.g., response time actually improved by 4% when prefetchers are off even with the high performance computing (HPC) workload running).

Further, the techniques described herein can efficiently implement the kind of optimization illustrated in TABLE 1. For example, using the techniques described herein, the virtual machine monitor will be able to turn prefetchers off (e.g., by setting the configuration on the virtual machine control to web prefetcher settings). As describe above, this can be triggered by a user administrator and/or an automation administrator.

Lastly, the high performance computing (HPC) workload's performance was impacted negatively when the prefetchers were turned off. This impact could be significantly reduced with the techniques described herein since the virtual machine monitor may turn these prefetchers on for that workload in the virtual machine control (e.g., by setting the configuration on the virtual machine control to high performance computing (HPC) prefetcher settings). This may mean that even all workloads, regardless of their runtime requirements, may benefit from the techniques described herein.

The above examples illustrate how the techniques described herein can be used to optimize the performance of varying workloads at runtime by the virtual machine monitor. This optimization does not happen at the expense of other workloads running; however, without a proper virtual machine control configuration the performance for multiple workloads may be optimized simultaneously.

As illustrated here, it may be hard to predict the runtime platform requirements for all workloads at all times in the public cloud. Accordingly, the procedures described herein may permit the facility to modify the platform features as it sees fit.

Figure 5:
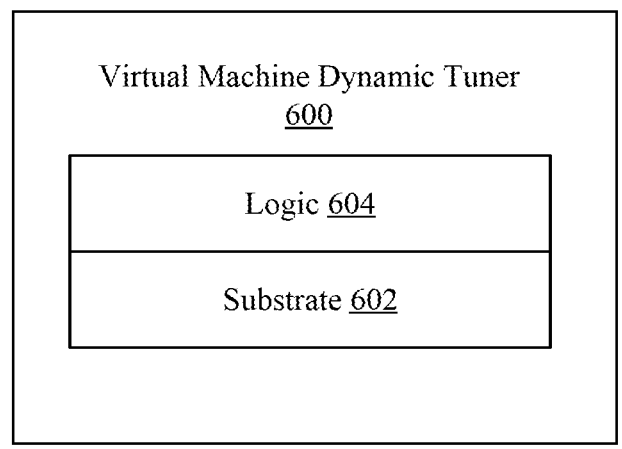
FIG. 5 is a block diagram of an example of a logic architecture according to an embodiment.

FIG. 5 shows a virtual machine dynamic tuner apparatus 600 (e.g., semiconductor package, chip, die). The apparatus 600 may implement one or more aspects of the method 300 (FIG. 2). The apparatus 600 may be readily substituted for some or all of the virtual machine dynamic tuner system 100 (FIG. 1), already discussed. The illustrated apparatus 600 includes one or more substrates 602 (e.g., silicon, sapphire, gallium arsenide) and logic 604 (e.g., transistor array and other integrated circuit/IC components) coupled to the substrate(s) 602. The logic 604 may be implemented at least partly in configurable logic or fixed-functionality logic hardware.

Moreover, the logic 604 may configure one or more first logical cores associated with a first virtual machine of a cloud server platform, where the configuration of the one or more first logical cores is based at least in part on one or more first feature settings. The logic 604 may also configure one or more active logical cores associated with an active virtual machine of the cloud server platform, where the configuration of the one or more active logical cores is based at least in part on one or more active feature settings, and where the active feature settings are different than the first feature settings.

Figure 6:
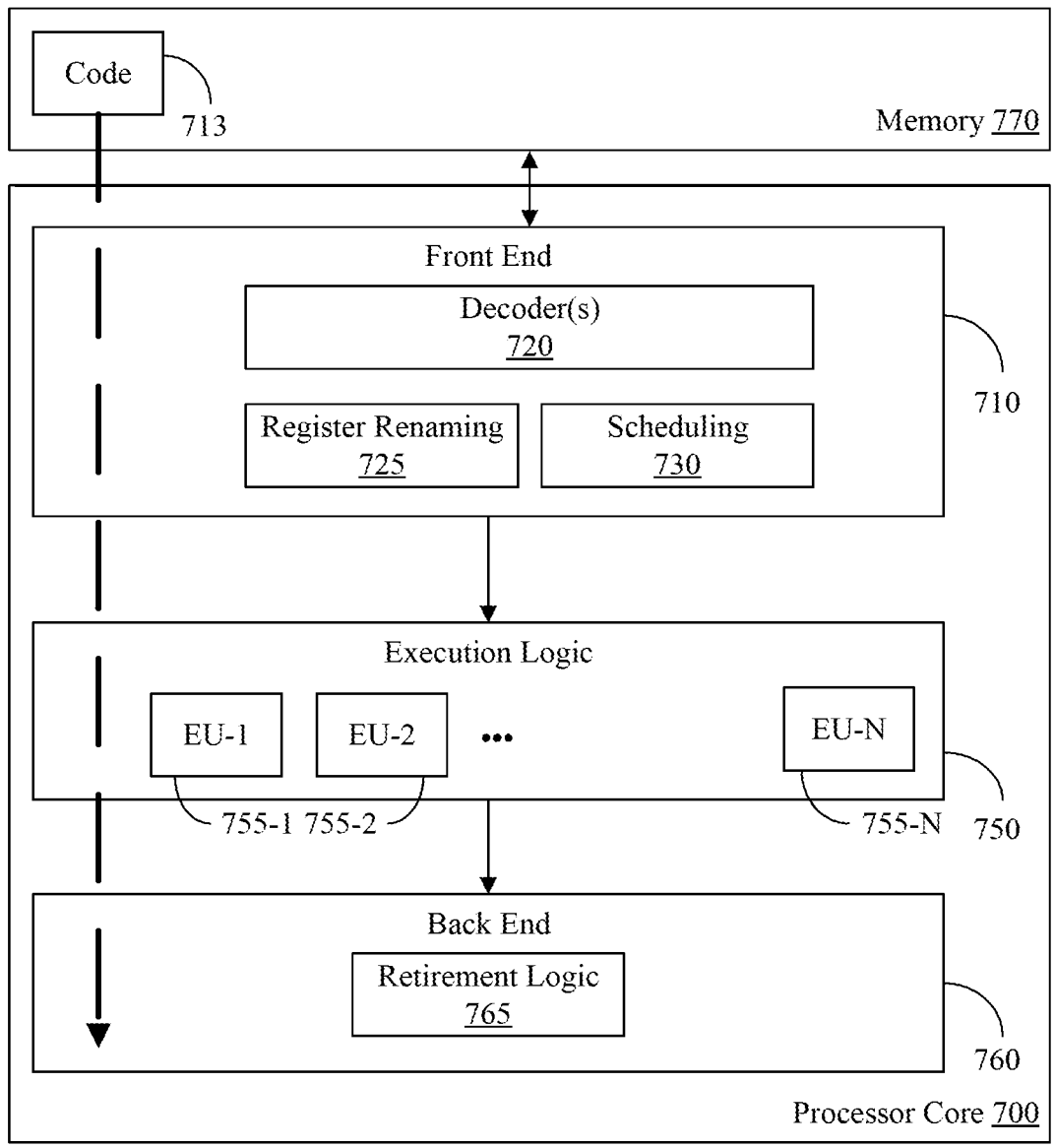
FIG. 6 is a block diagram of an example of a processor according to an embodiment.

FIG. 6 illustrates a processor core 700 according to one embodiment. The processor core 700 may be the core for any type of processor, such as a micro-processor, an embedded processor, a digital signal processor (DSP), a network processor, or other device to execute code. Although only one processor core 700 is illustrated in FIG. 6, a processing element may alternatively include more than one of the processor cores 700 illustrated in FIG. 6. The processor core 700 may be a single-threaded core or, for at least one embodiment, the processor core 700 may be multithreaded in that it may include more than one hardware thread context (or "logical processor") per core.

FIG. 6 also illustrates a memory 770 coupled to the processor core 700. The memory 770 may be any of a wide variety of memories (including various layers of memory hierarchy) as are known or otherwise available to those of skill in the art. The memory 770 may include one or more code 713 instruction(s) to be executed by the processor core 700, wherein the code 713 may implement one or more aspects of the method 300 (FIG. 2), already discussed.

The processor core 700 follows a program sequence of instructions indicated by the code 713. Each instruction may enter a front-end portion 710 and be processed by one or more decoders 720. The decoder 720 may generate as its output a micro operation such as a fixed width micro operation in a predefined format, or may generate other instructions, microinstructions, or control signals, which reflect the original code instruction. The illustrated front end portion 710 also includes register renaming logic 725 and scheduling logic 730, which generally allocate resources and queue the operation corresponding to the convert instruction for execution.

The processor core 700 is shown including execution logic 750 having a set of execution units 755-1 through 755-N. Some embodiments may include a number of execution units dedicated to specific functions or sets of functions. Other embodiments may include only one execution unit or one execution unit that can perform a particular function. The illustrated execution logic 750 performs the operations specified by code instructions.

After completion of execution of the operations specified by the code instructions, back end logic 760 retires the instructions of the code 713. In one embodiment, the processor core 700 allows out of order execution but requires in order retirement of instructions. Retirement logic 765 may take a variety of forms as known to those of skill in the art (e.g., re-order buffers or the like). In this manner, the processor core 700 is transformed during execution of the code 713, at least in terms of the output generated by the decoder, the hardware registers and tables utilized by the register renaming logic 725, and any registers (not shown) modified by the execution logic 750.

Although not illustrated in FIG. 6, a processing element may include other elements on chip with the processor core 700. For example, a processing element may include memory control logic along with the processor core 700. The processing element may include I/O control logic and/or may include I/O control logic integrated with memory control logic. The processing element may also include one or more caches.

Figure 7:
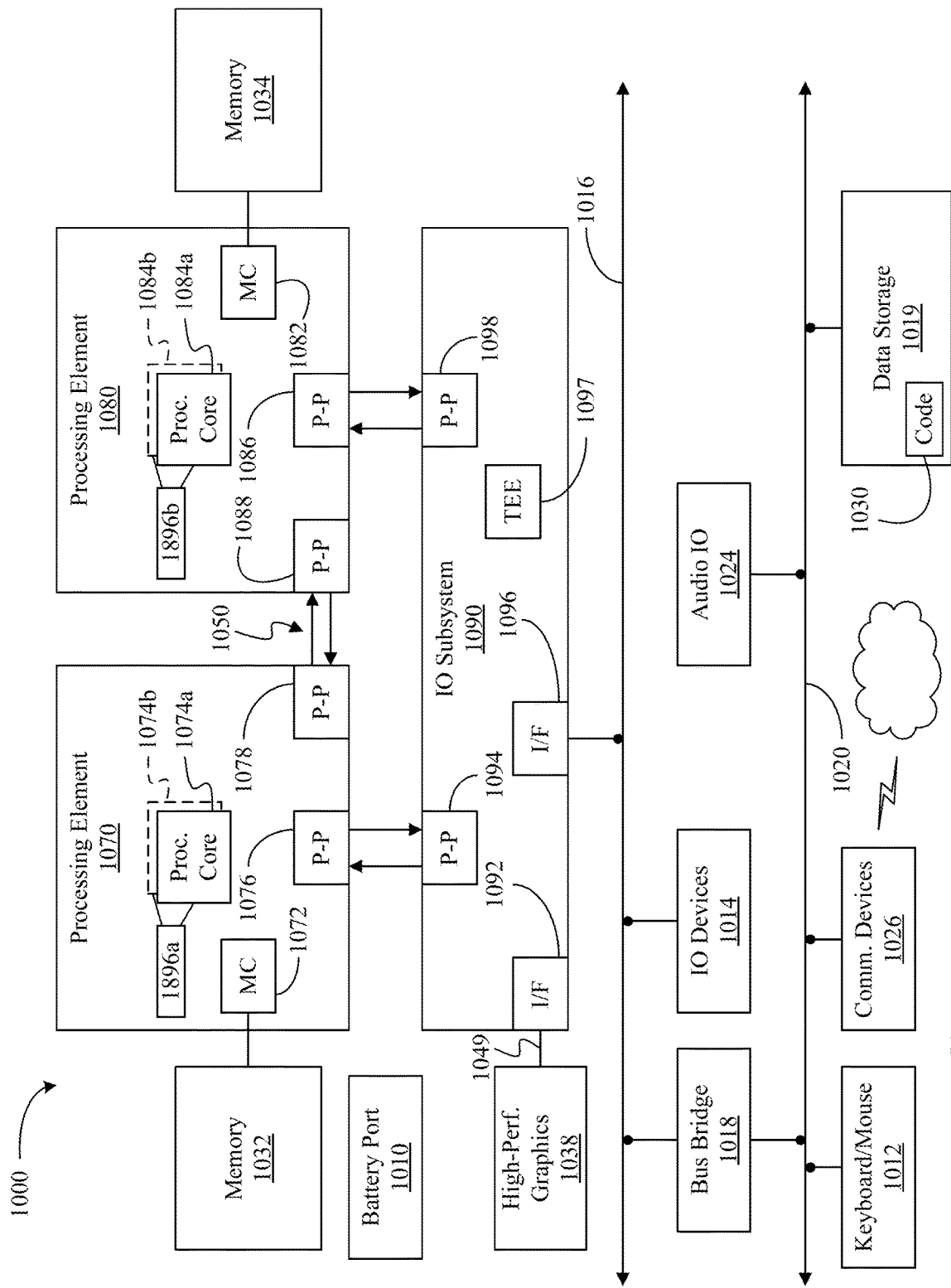
FIG. 7 is a block diagram of an example of a computing system according to an embodiment.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device, which may include code 1030, in one embodiment.

The illustrated code 1030, which may be similar to the code 713 (FIG. 6), may implement one or more aspects of the method 300 (FIG. 2), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

ADDITIONAL NOTES AND EXAMPLES

Example 1 may include a system to manage virtual machines, including a cloud server platform, the cloud server platform including a substrate and logic coupled to the substrate, where the logic is to configure one or more first logical cores associated with a first virtual machine of the cloud server platform, where the configuration of the one or more first logical cores is based at least in part on one or more first feature settings; determine one or more active feature settings that are specific to an active application associated with an active virtual machine based at least in part on application runtime requirements, wherein the active feature settings are different than the first feature settings; and configure one or more active logical cores associated with the active virtual machine of the cloud server platform, where the configuration of the one or more active logical cores is based at least in part on the one or more active feature settings.

Example 2 may include the system of Example 1, where the application runtime requirements include at least one of an indication of latency sensitivity and an indication of a data reference pattern, where the data reference pattern includes an indication of whether the active application is a streaming application.

Example 3 may include the system of Example 1, where the active feature settings include idle power state settings, execution power state settings, or pre-fetch settings.

Example 4 may include the system of Example 1, where the logic is to independently assign the active feature settings to the active virtual machine and independently assign the first feature settings to the first virtual machine on a virtual machine-by-virtual machine basis.

Example 5 may include the system of Example 4, where the logic is to iteratively identify reschedule events, and iteratively schedule the active virtual machine to run on a specific set of logical cores including the one or more active logical cores in response to identified reschedule events.

Example 6 may include the system of Example 1, where the logic is to store a bit mask of the active feature settings in control fields of a virtual machine control associated with the active virtual machine.

Example 7 may include the system of Example 6, where the logic is to transfer the bit mask of active feature settings specific to the active application from the control fields of the virtual machine control, and enforce the active feature settings specific to the active application by adapting the operation of the active logical cores to support the active virtual machine and active application.

Example 8 may include a method to manage virtual machines, including configuring one or more first logical cores associated with a first virtual machine of a cloud server platform, where configuring the one or more first logical cores is based at least in part on one or more first feature settings; determining one or more active feature settings that are specific to an active application associated with an active virtual machine based at least in part on application runtime requirements, wherein the active feature settings are different than the first feature settings; and configuring one or more active logical cores associated with the active virtual machine of the cloud server platform, where configuring the one or more active logical cores is based at least in part on the one or more active feature settings.

Example 9 may include the method of Example 8, where the application runtime requirements include one or more of an indication of latency sensitivity and an indication of a data reference pattern, where the data reference pattern includes an indication of whether the active application is a streaming application, and where the active feature settings include one or more of idle power state settings, execution power state settings, or pre-fetch settings.

Example 10 may include the method of Example 8, further including independently assigning the active feature settings to the active virtual machine and independently assigning the first feature settings to the first virtual machine on a virtual machine-by-virtual machine basis, iteratively identifying reschedule events, and iteratively scheduling the active virtual machine to run on a specific set of logical cores including the one or more active logical cores in response to identified reschedule events.

Example 11 may include the method of Example 8, further including storing a bit mask of the active feature settings in control fields of a virtual machine control associated with the active virtual machine, transferring the bit mask of active feature settings specific to the active application from the control fields of the virtual machine control, and enforcing the active feature settings specific to the active application by adapting the operation of the active logical cores to support the active virtual machine and active application.

Example 12 may include at least one computer readable storage medium including a set of instructions, which when executed by a computing system, cause the computing system to configure one or more first logical cores associated with a first virtual machine of a cloud server platform, where the configuration of the one or more first logical cores is based at least in part on one or more first feature settings; determine one or more active feature settings that are specific to an active application associated with an active virtual machine based at least in part on application runtime requirements, wherein the active feature settings are different than the first feature settings; and configure one or more active logical cores associated with the active virtual machine of the cloud server platform, where the configuration of the one or more active logical cores is based at least in part on the one or more active feature settings.

Example 13 may include the at least one computer readable storage medium of Example 12, where the application runtime requirements include at least one of an indication of latency sensitivity and an indication of a data reference pattern, where the data reference pattern includes an indication of whether the active application is a streaming application, and where the active feature settings include idle power state settings, execution power state settings, or pre-fetch settings.

Example 14 may include the at least one computer readable storage medium of Example 12, where the instructions, when executed, cause the computing system to independently assign the active feature settings to the active virtual machine and independently assign the first feature settings to the first virtual machine on a virtual machine-by-virtual machine basis, iteratively identify reschedule events, and iteratively schedule the active virtual machine to run on a specific set of logical cores including the one or more active logical cores in response to identified reschedule events.

Example 15 may include the at least one computer readable storage medium of Example 12, where the instructions, when executed, cause the computing system to store a bit mask of the active feature settings in control fields of a virtual machine control associated with the active virtual machine, transfer the bit mask of active feature settings specific to the active application from the control fields of the virtual machine control, and enforce the active feature settings specific to the active application by adapting the operation of the active logical cores to support the active virtual machine and active application.

Example 16 may include an apparatus to manage virtual machines, including a first virtual machine of a cloud server platform, the first virtual machine including one or more first logical cores the first virtual machine having a first configuration to efficiently support a first feature setting arrangement on the one or more first logical cores; a feature administrator to determine an active feature setting arrangement specific to an active application based at least in part on application runtime requirements, wherein the active feature setting arrangement is different than the first feature setting arrangement; and an active virtual machine of the cloud server platform, the active virtual machine being associated with the active application, the active virtual machine including one or more active logical cores, the active virtual machine having an active configuration to efficiently support the active feature setting arrangement on the one or more active logical cores.

Example 17 may include the apparatus of Example 16, further including the active application associated with the active virtual machine, where the active application is associated with application runtime requirements, where the application runtime requirements include at least one of an indication of latency sensitivity and an indication of a data reference pattern, where the data reference pattern includes an indication of whether the active application is a streaming application.

Example 18 may include the apparatus of Example 16, where the active feature settings include idle power state settings, execution power state settings, or pre-fetch settings.

Example 19 may include the apparatus of Example 16, further including a virtual machine monitor to independently assign the active feature settings to the active virtual machine and independently assign the first feature settings to the first virtual machine on a virtual machine-by-virtual machine basis, iteratively identify reschedule events, and iteratively schedule the active virtual machine to run on a specific set of logical cores including the one or more active logical cores in response to identified reschedule events.

Example 20 may include the apparatus of Example 16, further including a virtual machine control, where the virtual machine control includes control fields to store a bit mask of the active feature settings, the virtual machine control associated with the active virtual machine, where the one or more active logical cores associated with the active virtual machine are to transfer the bit mask of active feature settings specific to the active application from the control fields of the virtual machine control, and enforce the active feature settings specific to the active application by adapting the operation of the active logical cores to support the active virtual machine and active application.

Example 21 may include the apparatus of Example 16, further including the active application associated with the active virtual machine, where the active application is associated with application runtime requirements, where the application runtime requirements include at least one of an indication of latency sensitivity and an indication of a data reference pattern, where the data reference pattern includes an indication of whether the active application is a streaming application, where the active feature settings include idle power state settings, execution power state settings, or pre-fetch settings, a virtual machine monitor to independently assign the active feature settings to the active virtual machine and independently assign the first feature settings to the first virtual machine on a virtual machine-by-virtual machine basis, iteratively identify reschedule events, iteratively schedule the active virtual machine to run on a specific set of logical cores including the one or more active logical cores in response to identified reschedule events, a virtual machine control, where the virtual machine control includes control fields to store a bit mask of the active feature settings, the virtual machine control associated with the active virtual machine, where the one or more active logical cores associated with the active virtual machine are to transfer the bit mask of active feature settings specific to the active application from the control fields of the virtual machine control, and enforce the active feature settings specific to the active application by adapting the operation of the active logical cores to support the active virtual machine and active application.

Example 22 may include an apparatus, including means for performing a method as described in any preceding Example.

Example 23 may include machine-readable storage including machine-readable instructions which, when executed, implement a method or realize an apparatus as described in any preceding Example.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system to manage virtual machines, comprising:
 a cloud server platform, the cloud server platform including a substrate and logic coupled to the substrate, wherein the logic is to:
  configure one or more first logical cores associated with a first virtual machine of the cloud server platform, wherein the configuration of the one or more first logical cores is based at least in part on one or more first feature settings;
  determine one or more active feature settings that are specific to an active application associated with an active virtual machine based at least in part on application runtime requirements, wherein the active feature settings are different than the first feature settings;
  assign the one or more active feature settings to the active virtual machine in response to the application runtime requirements;
  configure one or more active logical cores associated with the active virtual machine of the cloud server platform, wherein the configuration of the one or more active logical cores is based at least in part on the one or more active feature settings; and
 a power supply to provide power to the cloud server platform.

2. The system of claim 1, wherein the application runtime requirements include at least one of an indication of latency sensitivity and an indication of a data reference pattern, wherein the data reference pattern includes an indication of whether the active application is a streaming application.

3. The system of claim 1, wherein the active feature settings comprise idle power state settings, execution power state settings, or pre-fetch settings.

4. The system of claim 1, wherein the logic is to:
 independently assign the active feature settings to the active virtual machine and independently assign the first feature settings to the first virtual machine on a virtual machine-by-virtual machine basis.

5. The system of claim 4, wherein the logic is to:
 iteratively identify reschedule events; and
 iteratively schedule the active virtual machine to run on a specific set of logical cores comprising the one or more active logical cores in response to identified reschedule events.

6. The system of claim 1, wherein the logic is to:
 store a bit mask of the active feature settings in control fields of a virtual machine control associated with the active virtual machine.

7. The system of claim 6, wherein the logic is to:
transfer the bit mask of active feature settings specific to the active application from the control fields of the virtual machine control; and
enforce the active feature settings specific to the active application by adapting the operation of the active logical cores to support the active virtual machine and active application.

8. A method to manage virtual machines, comprising:
configuring one or more first logical cores associated with a first virtual machine of a cloud server platform, wherein configuring the one or more first logical cores is based at least in part on one or more first feature settings;
determining one or more active feature settings that are specific to an active application associated with an active virtual machine based at least in part on application runtime requirements, wherein the active feature settings are different than the first feature settings; and
configuring one or more active logical cores associated with the active virtual machine of the cloud server platform, wherein configuring the one or more active logical cores is based at least in part on the one or more active feature settings.

9. The method of claim 8, wherein the application runtime requirements include one or more of an indication of latency sensitivity and an indication of a data reference pattern, wherein the data reference pattern includes an indication of whether the active application is a streaming application, and wherein the active feature settings comprise one or more of idle power state settings, execution power state settings, or pre-fetch settings.

10. The method of claim 8, further comprising:
independently assigning the active feature settings to the active virtual machine and independently assigning the first feature settings to the first virtual machine on a virtual machine-by-virtual machine basis;
iteratively identifying reschedule events; and
iteratively scheduling the active virtual machine to run on a specific set of logical cores comprising the one or more active logical cores in response to identified reschedule events.

11. The method of claim 8, further comprising:
storing a bit mask of the active feature settings in control fields of a virtual machine control associated with the active virtual machine;
transferring the bit mask of active feature settings specific to the active application from the control fields of the virtual machine control; and
enforcing the active feature settings specific to the active application by adapting the operation of the active logical cores to support the active virtual machine and active application.

12. At least one non-transitory computer readable storage medium comprising a set of instructions, which when executed by a computing system, cause the computing system to:
configure one or more first logical cores associated with a first virtual machine of a cloud server platform, wherein the configuration of the one or more first logical cores is based at least in part on one or more first feature settings;
determine one or more active feature settings that are specific to an active application associated with an active virtual machine based at least in part on application runtime requirements, wherein the active feature settings are different than the first feature settings;
assign the one or more active feature settings to the active virtual machine in response to the application runtime requirements; and
configure one or more active logical cores associated with the active virtual machine of the cloud server platform, wherein the configuration of the one or more active logical cores is based at least in part on the one or more active feature settings.

13. The at least one non-transitory computer readable storage medium of claim 12, wherein the application runtime requirements include at least one of an indication of latency sensitivity and an indication of a data reference pattern, wherein the data reference pattern includes an indication of whether the active application is a streaming application, and wherein the active feature settings comprise idle power state settings, execution power state settings, or pre-fetch settings.

14. The at least one non-transitory computer readable storage medium of claim 12, wherein the instructions, when executed, cause the computing system to:
independently assign the active feature settings to the active virtual machine and independently assign the first feature settings to the first virtual machine on a virtual machine-by-virtual machine basis;
iteratively identify reschedule events; and
iteratively schedule the active virtual machine to run on a specific set of logical cores comprising the one or more active logical cores in response to identified reschedule events.

15. The at least one non-transitory computer readable storage medium of claim 12, wherein the instructions, when executed, cause the computing system to:
store a bit mask of the active feature settings in control fields of a virtual machine control associated with the active virtual machine;
transfer the bit mask of active feature settings specific to the active application from the control fields of the virtual machine control; and
enforce the active feature settings specific to the active application by adapting the operation of the active logical cores to support the active virtual machine and active application.

16. An apparatus to manage virtual machines, comprising:
a first virtual machine of a cloud server platform, the first virtual machine comprising one or more first logical cores implemented in portions of one or more associated hardware cores, the first virtual machine having a first configuration to efficiently support a first feature setting arrangement on the one or more first logical cores;
a feature administrator to determine an active feature setting arrangement specific to an active application based at least in part on application runtime requirements, wherein the active feature setting arrangement is different than the first feature setting arrangement;
a virtual machine monitor to assign the one or more active feature settings to the active virtual machine in response to the application runtime requirements; and
an active virtual machine of the cloud server platform, the active virtual machine being associated with the active application, the active virtual machine comprising one or more active logical cores, the active virtual machine having an active configuration to efficiently support the active feature setting arrangement on the one or more active logical cores.

17. The apparatus of claim 16, further comprising:
the active application associated with the active virtual machine, wherein the active application is associated with application runtime requirements, wherein the application runtime requirements include at least one of an indication of latency sensitivity and an indication of a data reference pattern, wherein the data reference pattern includes an indication of whether the active application is a streaming application.

18. The apparatus of claim 16, wherein the active feature settings comprise idle power state settings, execution power state settings, or pre-fetch settings.

19. The apparatus of claim 16, further comprising:
the virtual machine monitor further to:
   independently assign the active feature settings to the active virtual machine and independently assign the first feature settings to the first virtual machine on a virtual machine-by-virtual machine basis,
   iteratively identify reschedule events, and
   iteratively schedule the active virtual machine to run on a specific set of logical cores comprising the one or more active logical cores in response to identified reschedule events.

20. The apparatus of claim 16, further comprising:
a virtual machine control, wherein the virtual machine control includes control fields to store a bit mask of the active feature settings, the virtual machine control associated with the active virtual machine;
wherein the one or more active logical cores associated with the active virtual machine are to:
   transfer the bit mask of active feature settings specific to the active application from the control fields of the virtual machine control, and
   enforce the active feature settings specific to the active application by adapting the operation of the active logical cores to support the active virtual machine and active application.

21. The apparatus of claim 16, further comprising:
the active application associated with the active virtual machine, wherein the active application is associated with application runtime requirements, wherein the application runtime requirements include at least one of an indication of latency sensitivity and an indication of a data reference pattern, wherein the data reference pattern includes an indication of whether the active application is a streaming application;
wherein the active feature settings comprise idle power state settings, execution power state settings, or pre-fetch settings;
the virtual machine monitor further to:
   independently assign the active feature settings to the active virtual machine and independently assign the first feature settings to the first virtual machine on a virtual machine-by-virtual machine basis,
   iteratively identify reschedule events,
   iteratively schedule the active virtual machine to run on a specific set of logical cores comprising the one or more active logical cores in response to identified reschedule events;
a virtual machine control, wherein the virtual machine control includes control fields to store a bit mask of the active feature settings, the virtual machine control associated with the active virtual machine;
wherein the one or more active logical cores associated with the active virtual machine are to:
   transfer the bit mask of active feature settings specific to the active application from the control fields of the virtual machine control, and
   enforce the active feature settings specific to the active application by adapting the operation of the active logical cores to support the active virtual machine and active application.

\* \* \* \* \*